(12) United States Patent
Jonsson

(10) Patent No.: US 10,502,617 B2
(45) Date of Patent: Dec. 10, 2019

(54) MULTI-CHANNEL LIGHT SENSOR

(71) Applicant: Zumtobel Lighting Inc., Highland, NY (US)

(72) Inventor: Karl Jonsson, Rancho Santa Margarita, CA (US)

(73) Assignee: Zumtobel Lighting Inc., Highland, NY (US)

( * ) Notice: Subject to any disclaimer, the term of this patent is extended or adjusted under 35 U.S.C. 154(b) by 78 days.

(21) Appl. No.: 15/595,293

(22) Filed: May 15, 2017

(65) Prior Publication Data

US 2017/0328765 A1 Nov. 16, 2017

Related U.S. Application Data

(60) Provisional application No. 62/336,862, filed on May 16, 2016.

(51) Int. Cl.
*G01J 1/02* (2006.01)
*H05B 37/02* (2006.01)
(Continued)

(52) U.S. Cl.
CPC ............. *G01J 1/029* (2013.01); *G01J 1/0411* (2013.01); *G01J 1/32* (2013.01); *G01J 1/4228* (2013.01); *H05B 37/02* (2013.01)

(58) Field of Classification Search
CPC .. G01J 1/02; G01J 1/029; G01J 1/0411; G01J 1/0407; G01J 1/32; G01J 1/30; G01J 1/28;
(Continued)

(56) References Cited

U.S. PATENT DOCUMENTS 5,541,414 A 7/1996 Hori
2004/0052076 A1* 3/2004 Mueller ............... F21V 23/0442
362/293
(Continued)

FOREIGN PATENT DOCUMENTS

DE 10210470 A1 10/2003
GB 1355975 A 6/1974
JP 2011002414 A 1/2011

OTHER PUBLICATIONS

Machine translation of DE DE10210470 to Hinkel.
(Continued)

*Primary Examiner* — John R Lee
(74) *Attorney, Agent, or Firm* — The H.T. Than Law Group

(57) ABSTRACT

The present invention provides a multi-channel light sensor comprising a fragmented lens and a camera sensor; wherein the fragmented lens comprises lens elements; and wherein each lens element comprises an own optical axis and is adapted to direct light from a spatial area onto the camera sensor such that the light intensities of different spatial areas are spatially resolved on the camera sensor. Furthermore, a system is provided, which comprises at least one such multi-channel light sensor, at least one lighting device, and a light management device; wherein the light management device is adapted to receive the light intensities of the different spatial areas from the multi-channel light sensor; and wherein the light management device is adapted to control the at least one lighting device on the basis of the light intensities of the different spatial areas.

15 Claims, 4 Drawing Sheets

(51) Int. Cl.
*G01J 1/04* (2006.01)
*G01J 1/32* (2006.01)
*G01J 1/42* (2006.01)

(58) Field of Classification Search
CPC ... G01J 1/20; G01J 1/4228; G01J 1/42; H05B 37/02; H05B 39/04; H05B 39/041; H05B 39/042
See application file for complete search history.

(56) References Cited

U.S. PATENT DOCUMENTS

| | | | | |
|---|---|---|---|---|
| 2006/0076908 A1* | 4/2006 | Morgan | ............ | H05B 33/0842 |
| | | | | 315/312 |
| 2011/0064416 A1* | 3/2011 | Rajagopal | .......... | H04B 10/1149 |
| | | | | 398/130 |
| 2011/0211110 A1* | 9/2011 | Doublet | ................ | H04N 7/188 |
| | | | | 348/370 |
| 2012/0098439 A1* | 4/2012 | Recker | ............... | H05B 33/0815 |
| | | | | 315/152 |
| 2012/0206050 A1* | 8/2012 | Spero | ...................... | B60Q 1/04 |
| | | | | 315/152 |
| 2013/0214699 A1* | 8/2013 | Jonsson | ................... | F21V 3/00 |
| | | | | 315/297 |
| 2013/0215409 A1 | 8/2013 | Wiethege et al. | | |
| 2014/0270798 A1* | 9/2014 | Manahan | ............. | H04B 10/116 |
| | | | | 398/130 |
| 2015/0035440 A1* | 2/2015 | Spero | ...................... | B60Q 1/04 |
| | | | | 315/153 |
| 2015/0311977 A1* | 10/2015 | Jovicic | ................ | H04B 10/116 |
| | | | | 398/106 |
| 2016/0056894 A1* | 2/2016 | Bohler | ................ | H04B 10/116 |
| | | | | 398/130 |
| 2016/0073042 A1 | 3/2016 | Cambou | | |
| 2017/0160371 A1* | 6/2017 | Bockle | ..................... | G01J 1/42 |
| 2017/0328765 A1* | 11/2017 | Jonsson | ................. | G01J 1/029 |

OTHER PUBLICATIONS

Machine translation of JP JP2011002414 to Atsushi et al.
British Search Report issue in connection with the corresponding British Patent Application No. GB1620061.0 dated Jun. 5, 2017.

* cited by examiner

MULTI-CHANNEL LIGHT SENSOR

CROSS-REFERENCE TO RELATED PATENT APPLICATION

The present U.S. non-provisional patent application claims priority under 35 U.S.C. § 119(e) to U.S. provisional patent application Ser. No. 62/336,862, filed on May 16, 2016, entitled "Multi-Channel Light Sensor." This parent provisional application is incorporated herein by reference in its entirety.

FIELD OF THE INVENTION

The present invention relates to a multi-channel light sensor, in particular to a multi-channel light sensor for detecting light intensities, and to a system comprising at least one such multi-channel light sensor, a light management device and at least one lighting device.

TECHNICAL BACKGROUND

In the prior art light sensors are typically directional and single channel. In a room they are typically positioned and focused towards a light source, such as a lighting device or a window, in order to detect the light from that light source. For example a light sensor positioned in a room and focuses towards a window will detect the sunlight entering the room through the window. In order to control the lighting devices in a room on the basis of the different light levels respectively light intensities caused by different light sources in the room, such as the light emitted from the lighting devices and sunlight entering the room through a window, a plurality of state of the art light sensors, as described above, are needed. Installing such a light management system is complex and time consuming, as the state of the art light sensors need to be focused towards the different light sources.

Using cameras instead of the state of the art light sensors is not an option due the high costs of cameras, the high bandwidth requirements for processing the data from a camera and privacy concerns of people using a room, which is equipped with a light management system comprising a camera as a detection means.

Therefore, it is an object of the present invention to provide a multi-channel light sensor that provides a broader field of view of light levels respectively light intensities in an entire room in a cost effective way. It is a further object of the present invention to provide a light management system for controlling lighting devices in a room on the basis of the light intensities in the room, wherein the light management system may be easily installed.

These and other objects, which become apparent upon reading the following description, are solved by the subject-matter of the independent claims. The dependent claims refer to preferred embodiments of the invention.

SUMMARY OF THE INVENTION

According to the present invention a multi-channel light sensor is provided, wherein the multi-channel light sensor comprises a fragmented lens, and a camera sensor. The fragmented lens comprises lens elements, wherein each lens element comprises an own optical axis and is adapted to direct light from a spatial area onto the camera sensor such that the light intensities of different spatial areas are spatially resolved on the camera sensor.

In the context of the present invention, the term "multi-channel light sensor" has to be understood as a light sensor comprising more than one channel, preferably a plurality of channels, that is adapted to detect visible light. Such a light sensor is adapted to detect a plurality of different light intensities respectively light levels.

The term "light intensity of a spatial area" refers to the light level of a spatial area. That is, it refers to the amount of light emitted or reflected from a spatial area. For example, in case the spatial area corresponds to an area of a window, the light intensity refers to the amount of light, such as sunlight, that enters the room through that area of the window. In case the spatial area corresponds to an area comprising a lighting device, such as a LED device, the light intensity correspond to the amount of light emitted from the lighting device. That is, the light intensity will decrease, when the lighting device is dimmed. In case, the spatial area does not correspond to a light source respectively an area comprising a light source that emits light, the light intensity refers to the amount of light reflected from the spatial area. For example, if the spatial area corresponds to an area of a wall of a room, then the light intensity of this spatial area corresponds to the amount of light reflected from the area of the wall.

The term "light" refers to visible light respectively electromagnetic radiation in the visible spectrum.

The term "fragmented lens" refers to a lens with at least two lens elements, preferably a plurality of lens elements. The lens elements may be combined to form the fragmented lens or the fragmented lens may be integrally funned. That is, the fragmented lens is preferably one integral lens comprising segments, sectors or facetted sections with different optical characteristics or the fragmented lens is preferably a lens assembly comprising a plurality of different lenses being combined to form the fragmented lens. Preferably, the lens is made of transparent material, such as plastic or glass.

The term "lens element" refers to a segment, a sector or a facetted lens part of the fragmented lens that has specific optical characteristics, such as index of refraction. Preferably, the lens elements of a fragmented lens each have a different optical axis, so that they direct the light from different spatial areas to different corresponding areas of the camera sensor. That is, different lens elements of a fragmented lens direct light from different, preferably not overlapping, more preferred essentially adjacent, spatial angles (solid angles) onto the camera sensor. In case the spatial angles overlap, it is still possible to determine the differentiation by subtracting nearby spatial angles, i.e. it is still possible to achieve a spatial resolution of the light intensities of different spatial areas on the camera sensor. The lens elements of the fragmented lens may be of the same material or of different material. Moreover, the lens elements preferably differ in shape and size or the lens elements are preferably of the same shape and size. Preferably, the lens elements are integral parts of the fragmented lens or the lens elements are separate lenses that are combined to form the fragmented lens. It is preferred that the fragmented lens is a Fresnel lens, wherein the lens elements correspond to the different sections of the Fresnel lens.

The term "spatial area" refers to an area of the environment around the multi-channel light sensor, wherein each spatial area corresponds to a specific spatial angle respectively solid angle. For example, when the multi-channel light sensor is positioned in a room, then the room corresponds to the environment around the multi-channel light sensor and a spatial area may refer to an area in the room, such as an area of a wall, a window, the floor or the ceiling.

The term "camera sensor" refers to a light sensor that is adapted to detect light and convert the detected light into electrical signals respectively data representing the light intensities of the detected light.

According to the present invention the multi-channel light sensor comprises a fragmented lens and a camera sensor, wherein the fragmented lens comprising lens elements is adapted to direct light from a spatial area onto the camera sensor such that the light intensities of different spatial areas are spatially resolved on the camera sensor. With other words, the fragmented lens and the camera sensor form a multi-channel light sensor, wherein the fragmented lens comprises several optical segments or facetted sections. Each optical segment respectively facetted section comprises an own optical axis and directs respectively projects light from a distinct spatial area, i.e. area corresponding to a distinct spatial angle respectively solid angle, onto a distinct area of the camera sensor. That is, light from different spatial areas are directed respectively projected by the fragmented lens onto different respectively separate areas of the camera senor. Thus, each spatial area has a corresponding separate area on the camera sensor to which the light from the spatial area is direct respectively projected to. Therefore, the light intensities of different spatial areas are spatially resolved on the camera sensor. That is, a spatial resolution of light intensities is possible on the camera sensor due to the fragmented lens, in particular due to the lens elements of the fragmented lens.

The term "spatial resolution" refers to the ability to distinguish/discriminate between two spatial areas, i.e. the ability to detect light from two spatial areas as light from separate spatial areas and not as light from one spatial area. Thus, in the context of the present invention, the spatial resolution of light intensities refers to the ability to distinguish between the light intensities of different spatial areas. That is, the camera sensor is able to detect and distinguish the light intensities from the different spatial areas, because the fragmented lens, in particular the lens elements of the fragmented lens, directs the light of different spatial areas onto different areas of the camera sensor, such that the camera sensor detects the light intensities of the different spatial areas as separate light intensities and not as a single light intensity.

Therefore the multi-channel light sensor according to the present invention has a broad field of view, as the light intensities of several spatial areas may be detected by the multi-channel light sensor. This is advantageous, as less multi-channel light sensors are needed compared with the state of the art light sensors in order to observe a specific environment, such as a room, for a light management control of lighting devices on the basis of the different light intensities in that environment. Moreover, an installation of such a system is less complex. Namely, due to the broad field of view, the multi-channel light sensor does not need to be focused on specific light sources. Moreover, the multi-channel light sensor is also a cheap solution, as camera sensors with a low resolution are sufficient for detecting the light intensities. Moreover, the problems of high costs, high bandwidth and privacy issues that arise when using cameras do not arise with the multi-channel light sensor according to the present invention.

Preferably, the lens element is a Fresnel lens element, a convex lens element, a concave lens element or a hybrid thereof.

With other words, the lens elements of the fragmented lens may correspond to different types of lenses known to the skilled person or combinations of such lenses. Preferably, the lens elements correspond to the same type of lens and/or are made of the same material. However, the lens elements may also correspond to different types of lenses and/or may be made of different material. As already mentioned above, the lens elements may be integral parts of the fragmented lens or they may be separate lenses that are combined to a lens assembly forming the fragmented lens. The fragmented lens and, thus, the lens elements are preferably made of a transparent material, such as plastic or glass.

Preferably, the camera sensor comprises an array of photodiodes, also known as visible light sensor diodes, and/or an array of photoresistors, also known as light dependent resistors (LDRs).

With other words, the camera sensor preferably comprises electric elements that are adapted to convert light into electrical signals using the photoelectric effect. Preferably, any such electric element known to the skilled person may be used. Thus, according to the invention sensors with a low resolution, such as photodiodes and photoresistors, may be used for the camera sensor of the multi-channel light sensor. This is advantageous, as such sensors are cheap.

Preferably, the camera sensor corresponds to a black and white camera sensor.

With other words, the camera sensor preferably detects light intensities without detecting the spectral information respectively color information of the detected light. This is advantageous, as such sensors are cheaper than color camera sensors.

Optionally the camera sensor of the multi-channel light sensor corresponds to a color image sensor (also known as "color camera image sensor" and "color camera sensor"), such as e.g. CMOS and/or CCD based imaging sensors, such that the camera sensor is adapted to detect spectral information, also known as color information, of the light of the different spatial areas. That is, the multi-channel light sensor optionally comprises a color image sensor.

The spectral information respectively color information allow for secondary use cases such as adapting color or color tunable light to the ambient light spectral characteristics.

With other words, using a color image sensor as the camera sensor of the multi-channel light sensor allows to receive spectral information respectively color information of the light of a spatial area. The term "color image sensor" refers to a sensor capable of receiving spectral information at a given point. As a result of using a color image sensor the multi-channel light sensor, in particular the camera sensor, is able to detect spectral information respectively spectral signatures of the light of the different spatial areas of the environment, wherein it is possible to determine contextual information, such as the color, of the spatial areas. For example, when using the multi-channel light sensor with a color image sensor in a room, the multi-channel light sensor is able to determine the color information or other contextual information in the room such as e.g. color characteristics of the walls, the floor and the ceiling, color characteristics of objects in a certain location of the room, the influence by the sunlight thereon and/or the dynamic change of the daylight/sunlight.

Preferably, the multi-channel light sensor comprises a controller that is adapted to store the light intensities of the different spatial areas and/or to communicate the light intensities of the different spatial areas to a networked system.

Preferably, the controller is a microcontroller, an ASIC or a hybrid thereof. The light intensities may be stored in a memory that is part of the multi-channel light sensor or may be stored in a memory to which the multi-channel light sensor is connected to. This is advantageous, as the light intensities may be thus processed by other units of a networked system, such as a light management device of a light management system for controlling lighting devices on the basis of light intensities in a room.

According to the present invention a system is also provided, wherein the system comprises at least one multi-channel light sensor according to the present invention, as described above, at least one lighting device, and a light management device. The light management device is adapted to receive the light intensities of the different spatial areas from the multi-channel light sensor; and the light management device is adapted to control the at least one lighting device on the basis of the light intensities of the different spatial areas.

With other words, the present invention provides a light management system, in which a light management device controls at least one lighting device on the basis of light intensities of different spatial areas received from at least one multi-channel light sensor according to the present invention.

The term "light management device" refers to a device that is adapted to receive data, such as light intensities, and control lighting devices, such as turning on/off lighting devices, dimming lighting devices etc., on the basis of the received data. The light management device is preferably a microcontroller, an ASIC and/or a hybrid thereof.

The term "lighting device" refers to an electric device that is adapted to emit light, such as a LED device. Any other lighting device known to the skilled person may also be used. Preferably, the system comprises a plurality of lighting devices, i.e. more than one lighting device.

Preferably, the light management device is adapted to use an algorithm, such as a VLC algorithm, to interpret the light intensities received from the at least one multi-channel light sensor.

With other words, the light management device is preferably configured to interpret the light intensities for controlling lighting devices by performing an algorithm, such as a VLC algorithm.

In particular, in a room with LED lighting devices that support VLC modulation ("Visual Light Communication modulation") the multi-channel light sensor may be adapted to decode the VLC modulated signals in the room using a VLC decoding algorithm and to determine based on the results of the VLC decoding algorithm an estimated location and light distribution of each LED lighting device in the room.

Furthermore, it is preferred that the light management device is adapted to control the at least one lighting device by comparing the light intensities of the different spatial areas received from the at least one multi-channel light sensor.

With other words, the light management device preferably compares the light intensities of the different spatial areas received from the at least one multi-channel light sensor in order to control respectively adapt the emission of light by the at least one light emitting device. For example, in case the system comprises a plurality of lighting devices, the light management device is adapted to dim the lighting devices, which are arranged in a spatial area of the room with a higher light intensity, such as an area next to a window during a shiny day. Namely, by comparing the light intensities of the different spatial areas, the light management device determines the spatial areas with higher light intensities and, thus, is able to dim the lighting devices arranged in these spatial areas. This is advantageous, as diming the lighting devices that are arranged respectively positioned in a spatial area of a room with a high light intensity, such as an area next to a window, compared to a spatial area in a dark corner of the room allows a homogenous illumination of the room, while saving energy.

Moreover, the light management device is able to adapt the light emission by the lighting devices to changing conditions, such as the turning on/off of lighting devices or a change of the sunlight.

For example, in case less sunlight respectively light is entering a room through a window due to e.g. clouds, the light management device is able to detect this change of light intensity in the spatial area near the window and, thus, is able control the lighting devices arranged in this spatial area to emit more light. Thus, the light management system is adapted to perform an autonomous setting of the light emission of the lighting devices in a room. Furthermore, the light management system is adapted to provide a constant illumination of the room by responding to changing lighting conditions in the room.

Preferably, the light management device is adapted to control the at least one lighting device on the basis of spectral information of the light of the different spatial areas received from the at least one multi-channel light sensor.

With other words, the light management device may control lighting devices arranged in a room on the basis of the color of the light emitted by the lighting devices in the room as well as on the basis of the color of the walls, the ceiling, the floor and/or objects, such as furniture, of the room. That is, the light management device may control the light intensity (amount of light emitted) as well as the color or color levels of the light of the lighting devices arranged in a room on the basis of the spectral information of the light of the different spatial areas of the room received from the at least one multi-channel light sensor.

Preferably, the light management device is adapted to determine the environment around the multi-channel light sensor by comparing the light intensities of the different spatial areas received from the at least one multi-channel light sensor.

The term "environment around the multi-channel light sensor" refers to the environment in which the multi-channel light sensor is arranged and in which it detects light intensities. For example the environment may be a room, wherein spatial areas may correspond to spatial areas of the room, such as areas of the walls, the floor etc. In a room the light intensities of walls, the floor and the ceiling typically differ, i.e. the amount of light reflected from the walls, the floor and the ceiling differs. Thus, the light management device is adapted to determine a rough scheme of the room shape by comparing the light intensities of the walls, the floor and/or the ceiling received from the at least one multi-channel light sensor. That is, the light management device is able to determine the room, in which the multi-channel light sensor is installed, by comparing the light intensities of the different spatial areas of the room received from the multi-channel light sensor. Furthermore, the light management device is adapted to detect objects, such as furniture, in a room, as the light intensities of different objects typically differ from each other as well as from the light intensities of the walls, the floor and/or the ceiling of the room.

Furthermore, it is preferred that the light management device is adapted to determine the environment around the at least one multi-channel light sensor by comparing the light intensities of neighboring spatial areas received from the at least one multi-channel light sensor.

Since typically the walls and the ceiling of a room have different light intensities, i.e. they reflect different amounts of light, the light management device may e.g. determine the border respectively the transmission between the walls and the ceiling by comparing the light intensities of neighboring spatial areas.

It is also preferred that the light management device is adapted to determine contextual information about the environment around the at least one multi-channel light sensor on the basis of spectral information of the light of the different spatial areas received from the at least one multi-channel light sensor.

With other words, the light management device is able to determine the colors in a room in which the multi-channel light sensor is arranged, such as the color of the walls, the floor and/or the ceiling, and the color of objects, such as furniture, that are present in the room.

Alternatively to a use in a light management system, the multi-channel light sensor may be used in a system for analyzing traffic or people by comparing the color of the vehicles or the color of clothes of people passing by the multi-channel light sensor. This is advantageous compared to the use of a standard camera, which causes an intense real-time image processing load.

Preferably, the system comprises a plurality of lighting devices and the light management device is adapted to identify one of the plurality of lighting devices and/or to determine the correlation between at least two lighting devices of the plurality of lighting devices on the basis of the light intensities of the different spatial areas received from the at least one multi-channel light sensor.

With other words, in a room comprising a plurality of lighting devices the light management device is preferably adapted to identify one of the plurality of lighting devices by using the light intensities of the different spatial areas of the room. Namely, higher light intensities typically correspond to spatial areas of the room, where lighting devices are arranged. In case the lighting devices are grouped and one group of the lighting devices is dimmed compared to the other groups of lighting devices, the light intensities of the spatial areas comprising the lighting devices of the dimmed group will be lower than the lighting intensities of the spatial areas comprising the lighting devices that are not dimmed. Thus, the light management device is adapted to determine a correlation between lighting devices, such as a group of lighting devices that are commonly dimmed, on the basis of the light intensities received from a multi-channel light sensor.

Furthermore, it is preferred that the light management device is adapted to identify one of the plurality of lighting devices and/or to determine the correlation between at least two lighting devices of the plurality of lighting devices by controlling the lighting devices to flash and sampling the light intensities of the different spatial areas received from the at least one multi-channel light sensor.

With other words, by increasing the light emission of a lighting device for a short time period, i.e. flashing the lighting device, the light intensity corresponding to the spatial area comprising the flashed lighting device will increase for a short time period. Since the light intensity of that spatial area is detected by the multi-channel light sensor, in particular by the camera sensor of the multi-channel light sensor, the light management device is able to identify on the basis of the light intensities received from the multi-channel light sensor the spatial area comprising the flashed lighting device and, thus, the light management device is able to identify the flashed lighting device.

The multi-channel light sensor provides in the above described system (light management system) the light intensities respectively light levels of different spatial areas of a room with a high spatial resolution, such that the light management unit is able to adjust and compensate light intensities respectively light levels across the entire room. Preferably, the light management unit is adapted to identify in which room a lighting device is located and where the lighting device is positioned compared to other lighting devices in the room on the basis of the light intensities provided by at least one multi-channel light sensor. That is, the system preferably comprises a plurality of multi-channel light sensors, which are positioned in a plurality of rooms, wherein the light management system is adapted to receive light intensities of different spatial areas of the different rooms, preferably with spectral information. Thus, the light management device is preferably adapted to control the lighting devices in the different rooms based on the received light intensities.

Moreover, for adjustable lighting devices, such as spotlights, the multi-channel light sensor is adapted to detect changes in the light settings, such as a rearrangement of the lighting devices, and the light management device may provide autonomous or manual compensation for the changes.

Preferably, the multi-channel light sensor, in particular the controller of the multi-channel light sensor, corresponds to the light management device of the system. That is, the multi-channel light sensor may perform the functions described above with respect to the light management device. In case there are a plurality of multi-channel light sensors, one of the multi-channel light sensors, in particular the controller of one of the multi-channel light sensor, preferably acts as the light management device, wherein the other multi-channel light sensors provide this multi-channel light sensor with their detection results, i.e. light intensities from different spatial areas and/or spectral information of the light from the different spatial areas.

DESCRIPTION OF A PREFERRED EMBODIMENT

In the following, the invention is described exemplarily with reference to the enclosed figures, in which FIG. 1 is a schematic view of a multi-channel light sensor according to a preferred embodiment of the present invention, wherein two examples of a fragmented lens are shown.

FIG. 2 schematically shows the lens elements of a segmented lens according to a preferred embodiment of the present invention and shows for each lens element the corresponding detection area;

Figure 1:
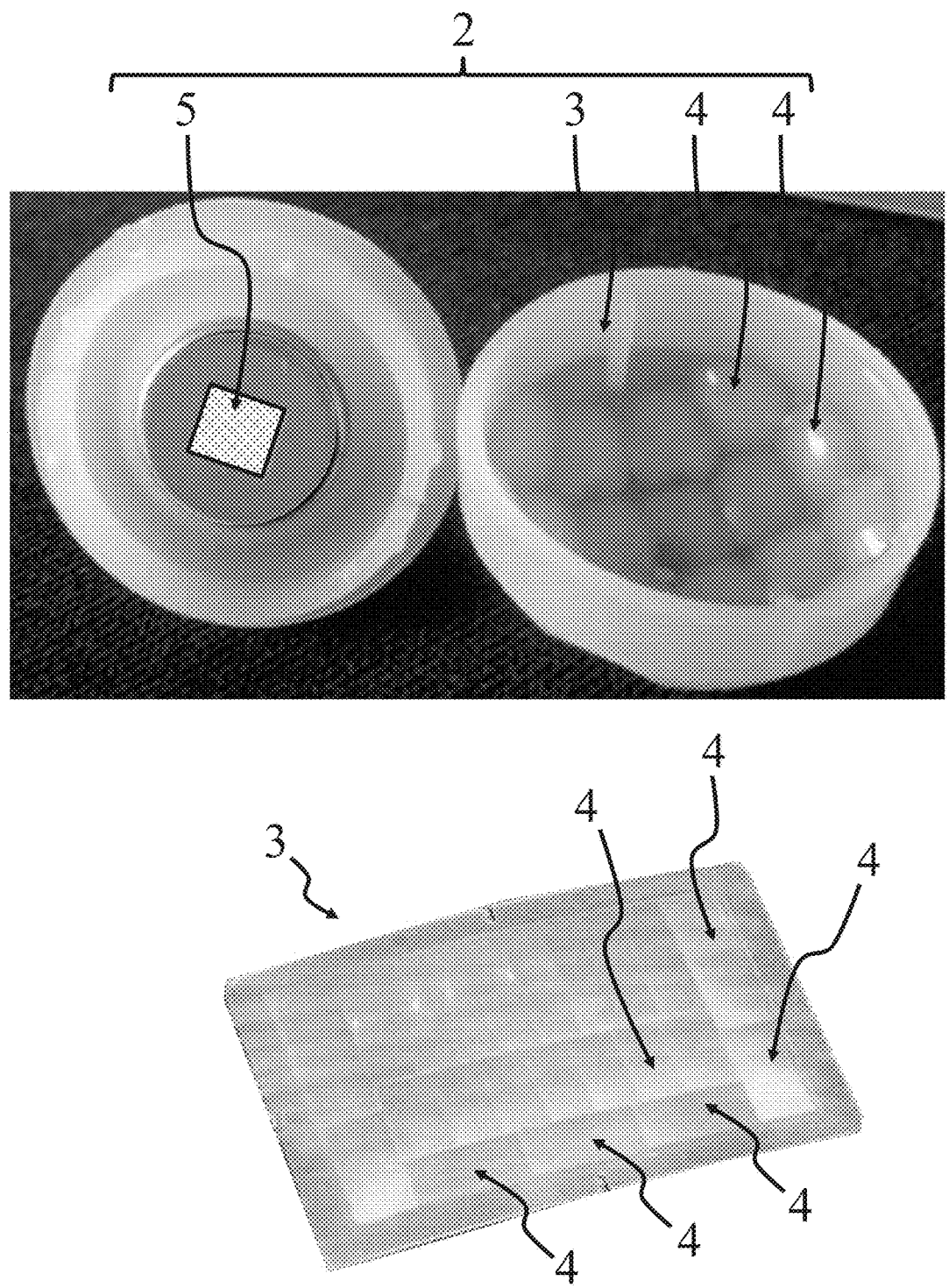
FIG. 1 is a schematic view of a multi-channel light sensor 2 according to a preferred embodiment of the present invention, wherein two examples of a fragmented lens 3 are shown.

The multi-channel light sensor 2 comprises a camera sensor 5 and a fragmented lens 3, which comprises lens elements 4 (in FIG. 1 only some lens elements are marked with a reference number). At the top of FIG. 1 a first example of the fragmented lens 3 is shown and at the bottom a second example of a fragmented lens 3 is shown. The lens elements 4 of the first example of the fragmented lens 3 are basically round, whereas the lens elements 4 of the second example of the fragmented lens 3 are basically rectangular. The camera sensor 5 and the fragmented lens 3 are combined, preferably the fragmented lens 3 is positioned above the camera sensor 5, to form the multi-channel light sensor 2. The camera sensor 5 and the fragmented lens 4 are as described above. The multi-channel light sensor 2 may comprise a controller, which is not shown in FIG. 1.

Figure 2:
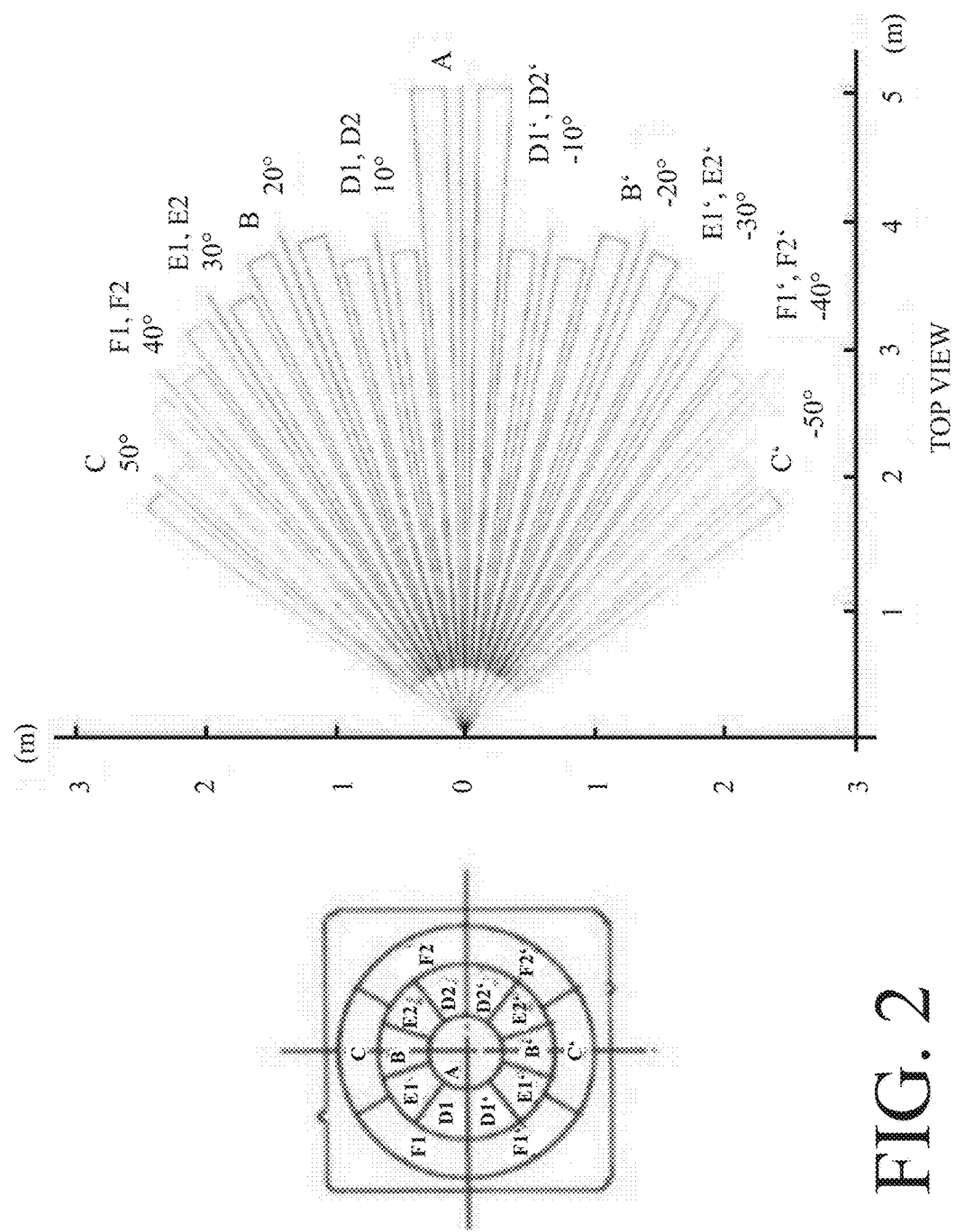

FIG. 2 schematically shows the lens elements A, B, B', C, C', D1, D2, D1', D2', E1, E2, E1', E2', F1, F2, F1' and F2' of a segmented lens according to a preferred embodiment of the present invention and shows for each lens element the corresponding detection area. The term "detection area of a lens element" refers to the spatial area from which light may be directed by a lens element of the fragmented lens onto the camera sensor. The detection area is identified in FIG. 2 by the spatial angle respectively solid angle. That is, the respective spatial area from which a lens element is adapted to direct the light onto the camera sensor is identified by the spatial angle respectively solid angle. For example the lens element C is adapted to direct the light of the spatial area corresponding to a spatial angle of 50° onto the corresponding area of the camera sensor.

Figure 3:
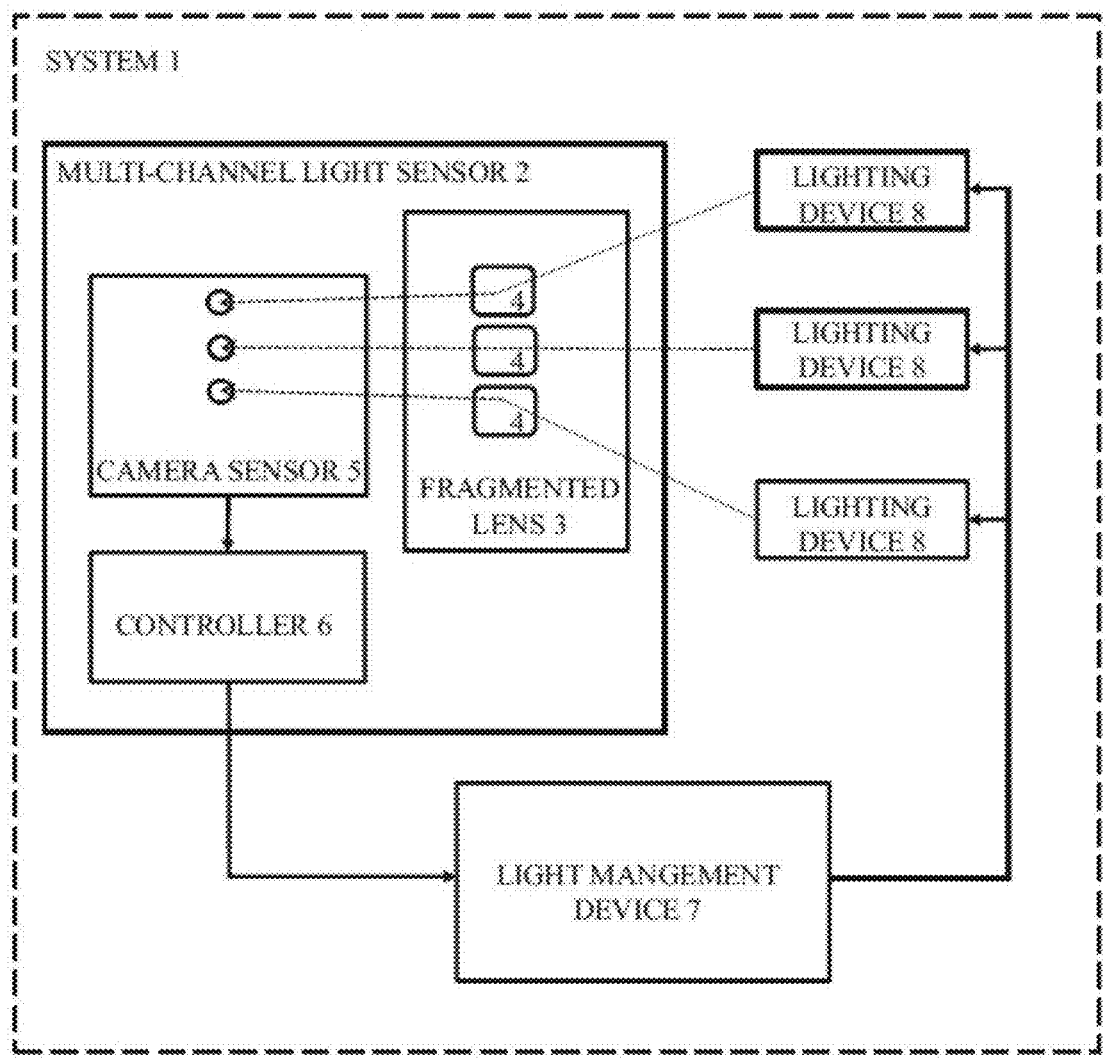
FIG. 3 is a schematic view of a system according to a preferred embodiment of the present invention.

FIG. 3 is a schematic view of a system 1 according to a preferred embodiment of the present invention. The system 1 is preferably a light management system. The system 1 comprises one multi-channel light sensor 2. Nevertheless the system may comprise more than one multi-channel light sensor and, thus, the system 1 comprises preferably at least one multi-channel light sensor 2. The multi-channel light sensor 2 comprises a fragmented lens 3 with light elements 4, a camera sensor 5 and a controller 6. Although in FIG. 3 three light elements 4 are illustrated, the fragmented lens 4 may comprise more or less lens elements. That is, the number of lens elements in FIG. 3 is only by way of example for describing the basic principle of the system 1. The system 1 further comprises a light management device 7 and lighting devices 8. According to FIG. 3 the system 1 comprises three lighting devices 8. However, the system 1 may comprise more or less lighting devices and, thus, the system 1 comprises at least one lighting device 8. That is, the number of lighting devices in FIG. 3 is only by way of example for describing the basic principle of the system 1. The lighting devices 8 are preferably located in different position of a room, i.e. in different spatial areas of a room.

In FIG. 3 it is indicated that the fragmented lens 3, particularly the lens elements 4 of the fragmented lens 3, direct the light of different lighting devices 8, i.e. the light of different spatial areas, to corresponding areas on the camera sensor 5, such that the light intensities of the different lighting devices 8 respectively of the different spatial areas are spatially resolved on the camera sensor 5. The controller 6 is adapted to store the light intensities of the different spatial areas and/or communicate them to a light management device 7.

The light management device 7 is adapted to control the lighting devices 8 on the basis of the light intensities received from the multi-channel light sensor 2, in particular the controller 6. Preferably, the light management device is adapted to roughly determine on the basis of the light intensities the shape of the room in which the multi-channel sensor 2 is positioned in. Moreover, the light management device 7 may determine contextual information about the room, such as the color of the walls, the floor and/or the ceiling, on the basis of spectral information received from the multi-channel light sensor 2.

As already mentioned above, the controller 6 may perform the functions of the light management device 7, such as controlling the lighting devices 8. In such a case the controller 6 may support the light management device 7 or the system 1 does not comprise a light management device 7.

Figure 4:
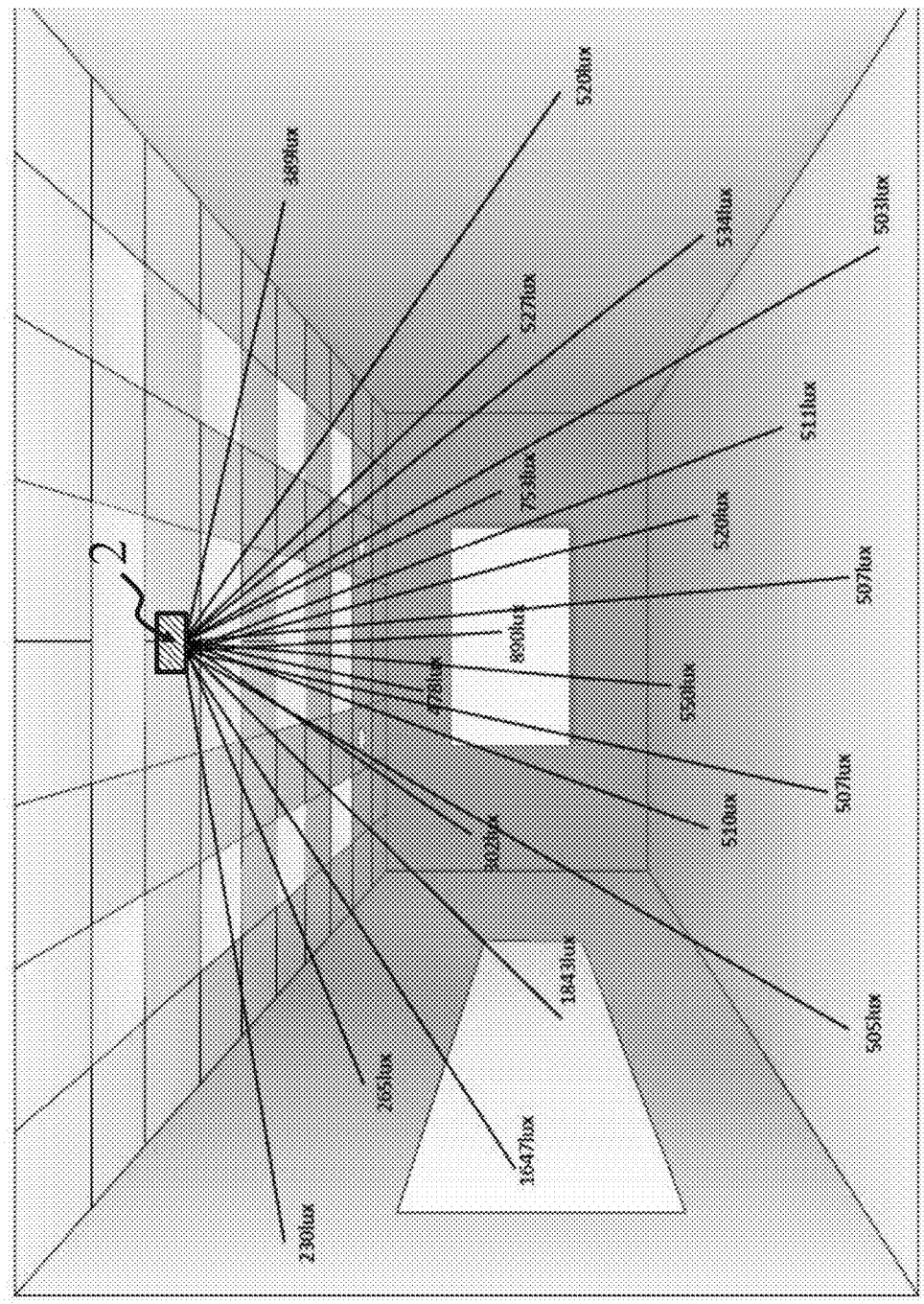
FIG. 4 is a schematic view of a room showing different light intensities in the room, which are detected by a multi-channel light sensor according to a preferred embodiment of the present invention.

FIG. 4 is a schematic view of a room showing different light intensities in the room, which are detected by a multi-channel light sensor according to a preferred embodiment of the present invention. In FIG. 4 the different light intensities respectively light levels in the room are indicated by a "Lux"-value. A higher "Lux"-value corresponds to a higher light intensity. In FIG. 4 it is indicated that the multi-channel light sensor 2 is adapted to detect light intensities of different spatial areas of the room, such as windows, walls, the ceiling and the floor of the room. Moreover, FIG. 4 shows that the different spatial areas of a room have different light intensities. Thus, a light management device and/or the multi-channel light sensor 2 are adapted to roughly determine the shape of a room on the basis of the light intensities of the different spatial areas of the room.

The invention claimed is:

1. Multi-channel light sensor (2) adapted to detect a plurality of different light intensities comprising
    a) a fragmented lens (3), and
    b) a camera sensor (5) adapted to detect visible light;
    c) wherein the fragmented lens (3) comprises lens elements (4); and
    d) wherein each lens element (4) is adapted to direct visible light from a spatial area onto the camera sensor (5) such that the light intensities of different spatial areas are spatially resolved on the camera sensor (5),
    wherein the lens elements each have a different optical axis, so that they direct the light from different spatial areas to different corresponding areas of the camera sensor,
    wherein the fragmented lens (3) is a Fresnel lens, and wherein the lens elements (4) correspond to different sections of the Fresnel lens.

2. Multi-channel light sensor (2) according to claim 1, wherein the camera sensor (5) comprises an array of photodiodes and/or an array of photoresistors.

3. Multi-channel light sensor (2) according to claim 1, wherein the camera sensor (5) corresponds to a black and white camera sensor.

4. Multi-channel light sensor (2) according to claim 1, wherein the camera sensor (5) corresponds to a color image sensor, such that the camera sensor (5) is adapted to detect spectral information of the light of the different spatial areas.

5. Multi-channel light sensor (2) according to claim 1, wherein the multi-channel light sensor (2) comprises a controller (6) that is adapted to store the light intensities of the different spatial areas and/or to communicate the light intensities of the different spatial areas to a networked system.

6. System (1) comprising
    a) at least one multi-channel light sensor (2) according to claim 1,
    b) at least one lighting device (8), and
    c) a light management device (7);
    d) wherein the light management device (7) is adapted to receive the light intensities of the different spatial areas from the at least one multi-channel light sensor (2); and
    e) wherein the light management device (7) is adapted to control the at least one lighting device (8) on the basis of the light intensities of the different spatial areas.

7. System (1) according to claim 6, wherein the light management device (7) is adapted to use an algorithm to interpret the light intensities received from the at least one multi-channel light sensor (2).

8. System (1) according to claim 6, wherein the light management device (7) is adapted to control the at least one lighting device (8) by comparing the light intensities of the different spatial areas received from the at least one multi-channel light sensor (2).

9. System (1) according to claim 6, wherein the light management device (7) is adapted to control the at least one lighting device (8) on the basis of spectral information of the light of the different spatial areas received from the at least one multi-channel light sensor (2).

10. System (1) according to claim 6, wherein the light management device (7) is adapted to determine the environment around the at least one multi-channel light sensor (2) by comparing the light intensities of the different spatial areas received from the at least one multi-channel light sensor (2).

11. System (1) according to claim 6, wherein the light management device (7) is adapted to determine the environment around the at least one multi-channel light sensor (2) by comparing the light intensities of neighboring spatial areas received from the at least one multi-channel light sensor (2).

12. System (1) according to claim 6, wherein the light management device (7) is adapted to determine contextual information about the environment around the at least one multi-channel light sensor (2) on the basis of spectral information of the light of the different spatial areas received from the at least one multi-channel light sensor (2).

13. System (1) according to claim 6,
 a) wherein the system comprises a plurality of lighting devices (8); and
 b) wherein the light management device (7) is adapted to identify one of the plurality of lighting devices (8) and/or to determine the correlation between at least two lighting devices (8) of the plurality of lighting devices (8) on the basis of the light intensities of the different spatial areas received from the at least one multi-channel light sensor (2).

14. System (1) according to claim 13, wherein the light management device (7) is adapted to identify one of the plurality of lighting devices (8) and/or to determine the correlation between at least two lighting devices (8) of the plurality of lighting devices (8) by controlling the lighting devices (8) to flash and sampling the light intensities of the different spatial areas received from the at least one multi-channel light sensor (2).

15. System (1) according to claim 7, wherein the algorithm is a Visual Light Communication (VLC) algorithm.

* * * * *